(12) United States Patent
Shankar

(10) Patent No.: US 7,080,114 B2
(45) Date of Patent: Jul. 18, 2006

(54) HIGH SPEED SCALEABLE MULTIPLIER

(75) Inventor: Ravi Shankar, Boca Raton, FL (US)

(73) Assignee: Florida Atlantic University, Boca Raton, FL (US)

( * ) Notice: Subject to any disclaimer, the term of this patent is extended or adjusted under 35 U.S.C. 154(b) by 470 days.

(21) Appl. No.: 10/004,958

(22) Filed: Dec. 4, 2001

(65) Prior Publication Data

US 2003/0105792 A1 Jun. 5, 2003

(51) Int. Cl.
*G06F 7/52* (2006.01)
(52) U.S. Cl. ...................................... 708/620
(58) Field of Classification Search ............ 708/503, 708/620, 625, 606
See application file for complete search history.

(56) References Cited

U.S. PATENT DOCUMENTS

| | | | |
|---|---|---|---|
| 3,610,906 A | 10/1971 | Stampler | |
| 3,749,898 A * | 7/1973 | Logan | 708/625 |
| 4,313,174 A | 1/1982 | White | 364/753 |
| 5,754,073 A | 5/1998 | Kimura | 327/359 |
| 6,012,078 A | 1/2000 | Wood | 708/620 |
| 6,032,169 A | 2/2000 | Malzahn et al. | 708/606 |

OTHER PUBLICATIONS

*Unsigned Multiplication*, <http://www.unf.edu/~swarde/Execution_Units/Unsigned_Multiplication/unsigned_multiplication.html>, (Dec. 31, 2000).
*Lecture 9—Binary Multiplication & Division*, <http://www.eecs.lehigh.edu/~mschulte/ece201-99/lect/lect8>, (Dec. 31, 2000).

* cited by examiner

Primary Examiner—Chuong D. Ngo
(74) *Attorney, Agent, or Firm*—Akerman Senterfitt

(57) ABSTRACT

A high speed scalable multiplier. The high speed scalable multiplier can include a folding multiplier configured to fold multiplicands and multipliers where individual ones of the multiplicands and multipliers exceed a folding threshold. The folding multiplier also can compute a product of the multiplicands and multipliers based on less than all bits forming the multiplicands and multipliers. The high speed scalable multiplier also can include a conventional multiplier and at least one additional folding multiplier, each of the multipliers being individually, selectably activatable.

6 Claims, 2 Drawing Sheets

HIGH SPEED SCALEABLE MULTIPLIER

BACKGROUND OF THE INVENTION

1. Technical Field

This invention relates generally to digital signal processing, and more particularly, a scalable multiplier configured to optimize the amount of memory utilized when performing multiplication in a computing device.

2. Description of the Related Art

In analog and digital computing the need often arises for a circuit that accepts two inputs, a multiplicand and a multiplier, and produces an output proportional to their product. Such a circuit, often referred to as a multiplier, is a basic building block used in numeric processing units such as digital signal processors. Utilizing AND gates and full adders, multiplication can be implemented in much the same way as hand multiplication. First, each digit of the multiplier can be multiplied by the multiplicand to generate partial products, the partial products for each successive digit being shifted one digit left. Each of the shifted partial products then can be summed to generate the product. Such an implementation has been referred to as Braun's multiplier and is considered by many to be a "brute force" method of performing multiplication.

Multiplication of two values, X and Y, can also be expressed as $$X*Y = ([X+Y]/2)^2 - ([X-Y]/2)^2$$

This expanded multiplication method commonly is used in implementing analog multipliers because this multiplication method reduces the multiplication process to merely producing the difference of two squared numbers. Like the Braun method, however, the expanded multiplication method can be processor and memory intensive, especially when both the multiplicand and multiplier are large values. In fact, a typical multiplier which has implemented expanded multiplication must process $2 \times 2^{16}$ combinations of multipliers and multiplicands when calculating the product of 16 bit analog values, hence requiring a correspondingly large amount of memory allocation and power.

Notably, the implementation and use of the expanded multiplication method can be especially taxing on digital signal processing (DSP) systems that must perform a large number of multiplications repeatedly, such as in video editing and audio processing. Specifically, the use of the expanded multiplication method in a DSP tends to require a large amount of DSP memory resources and can consume much power. Thus, the implementation of the expanded multiplication method in a DSP is not practical where the DSP has been included as part of a system in a portable device.

Importantly, the use of the expanded multiplication method can result in undesirable power dissipation. For many applications, speed and performance factors associated with a multiplication circuit can outweigh power dissipation inasmuch as many computing devices have access to an adequate power supply. Still, in battery powered devices, the power dissipation factor can become more important. In particular, in communications devices like cellular telephones in which battery life can be both an important marketing and operational element, it would be preferable to include a multiplication circuit which consumes less power, even at the expense of performance.

SUMMARY OF INVENTION

The present invention can include a high speed scalable multiplier which has been configured to optimize the amount of power consumed when performing digital multiplication. The high speed scalable multiplier can include a folding multiplier configured to fold multiplicands and multipliers where individual ones of the multiplicands and multipliers exceed a folding threshold. The folding multiplier also can compute a product of the multiplicands and multipliers based on less than all bits forming the multiplicands and multipliers. The high speed scalable multiplier also can include a conventional multiplier and at least one additional folding multiplier, each of the multipliers being individually, selectably activatable.

A folding multiplication method for reducing power dissipation when multiplying a multiplicand and multiplier in a computing device can include identifying a folding threshold below which multiplicands and multipliers, when multiplied cause less power dissipation than that which would be caused in a conventional multiplication. The method also can include determining whether either of the multiplicand or the multiplier exceed the folding threshold. If the multiplicand exceeds the folding threshold, a first non-zero scaling factor can be established for the multiplicand. Similarly, if the multiplier exceeds the folding threshold, a second non-zero scaling factor can be established for the multiplier.

The multiplicand and multiplier can be averaged and, in addition, a value can be computed which is equivalent to one-half of the difference of the multiplicand and multiplier. A first operand can be squared, the first operand being equal to the average less a fractional portion of the first scaling factor. Also, a second operand can be squared, the second operand being equal to the computed value less a fractional portion of the second scaling factor. A third operand can be squared, the third operand being equal to the fractional portion of the first scaling factor. Finally, a fourth operand can be squared, the fourth operand being equal to the fractional portion of the second scaling factor.

The first scaling factor can be multiplied by the average, this first multiplication resulting in a first product. Likewise, the second scaling factor can be multiplied by the computed value, this second multiplication resulting in a second product. The first square, first product and fourth square can be summed. Finally, the second square, second product and third square can be subtracted from the sum. The result of this subtraction can produce a folded product. Importantly, in a further aspect of the invention, the first squaring and the first multiplication can be performed using a value of zero for the first scaling factor only if the average evaluates equal to or below the folding threshold. Similarly, the second squaring and second multiplication can be performed using a value of zero for the second scaling factor only if the computed value evaluates equal to or below the folding threshold.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The present invention is a high speed scalable multiplier. The high speed scalable multiplier can selectively utilize a folding multiplier in order perform a multiplication operation in a manner in which processor resources, including power dissipation and memory, are allocated optimally. Specifically, based upon the size of individual multipliers and multiplicands, the numeric processor can select either a conventional multiplier or one or more folding multipliers to undertake multiplication in a computing device such as a digital signal processor. In this way, the conventional multiplication operation can be invoked only where such invocation will not overly tax the resources of the computing device.

Notably, as used herein, "folding" can mean programmatically reducing the size of the multiplicand, multiplier or both until the reduced multiplicand and multiplier are below a threshold at which the conventional multiplication of both will result in optimal utilization of the resources of the computing device. In accordance with the inventive arrangements, however, the folding operation can be performed without compromising the integrity of the product. That is to say, a folding operation which has been configured according to the present invention will not reduce the accuracy of the product and will produce a product which is identical to the product which would otherwise be produced using only a conventional multiplication operation.

In the high speed scalable multiplier of the present invention, the multiplication of values can be expressed as the well-known expanded multiplication algorithm:

$$X*Y=([X+Y]/2)^2-([X-Y]/2)^2$$

Though in a conventional multiplier, this expanded multiplication process can exhaust the resources of the digital device where the multiplicand and multiplier, X and Y, are large, in the present invention, the multiplier and multiplicand can be folded at least once. Upon folding the multiplicand and multiplier, the number of combinations required for a conventional multiplication process can be at least halved, thereby reducing by half the system memory required for the operation.

Notably, if the multiplier and multiplicand are folded a second time, the memory required for the multiplication process can be halved once again to one-fourth of the size required to perform the expanded multiplication process without folding. The folding process can continue recursively to further reduce the amount of memory required to perform the multiplication until an optimum number of foldings has been reached. The optimum number of foldings can vary depending on memory size, calculation speed, and available power.

Figure 1:
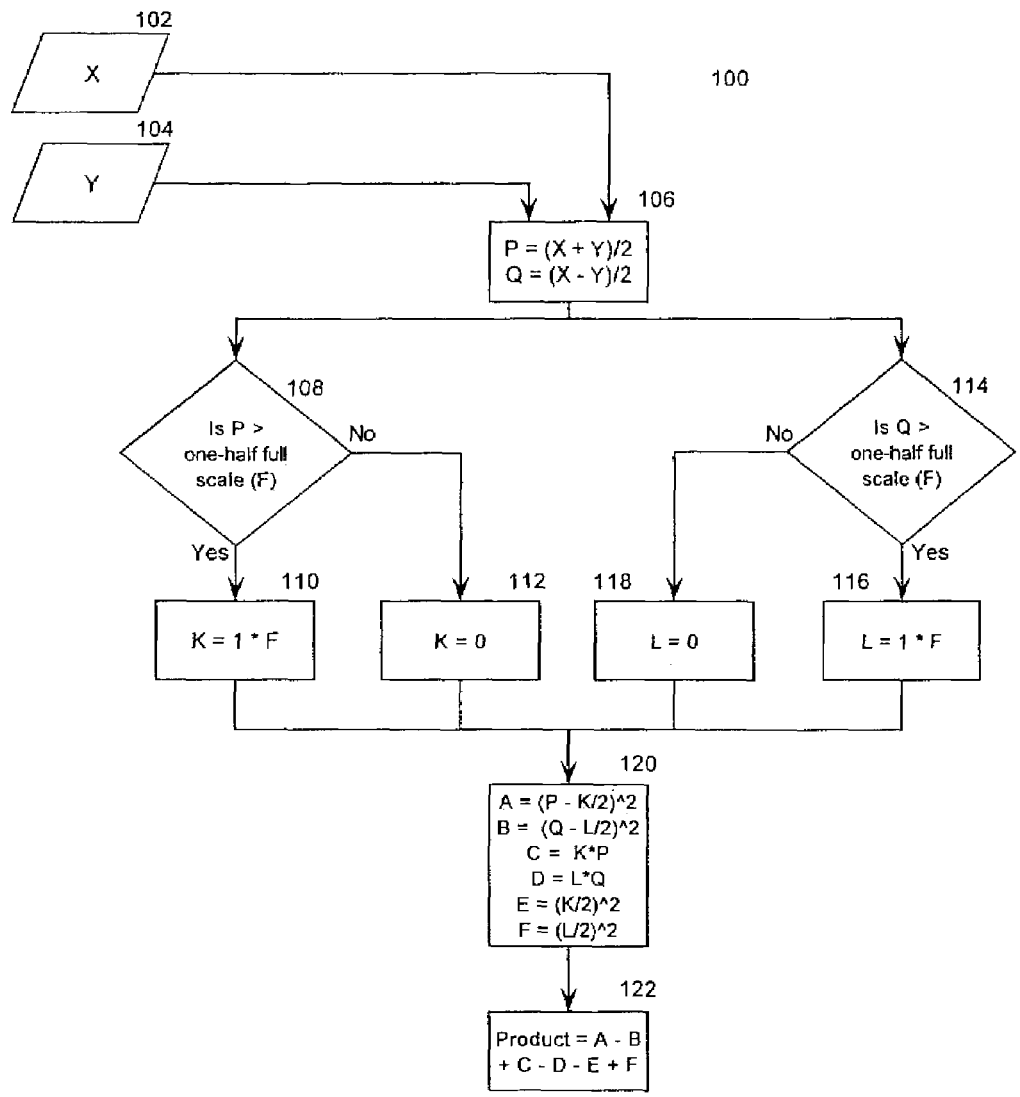
FIG. 1 is a flow chart that illustrates the high speed scalable multiplication method of the present invention.

FIG. 1 is a flow chart illustrating a folding process 100 for computing the product of two values, X and Y, which can be performed in a folding multiplier, and which can reduce the power dissipation experienced and memory required to calculate the product. Beginning in blocks 102 and 104, multiplicand and multiplier X and Y can be received from input and forwarded to the folding multiplier. Using conventional mathematical operations included therein, the folding multiplier can compute the average of X and Y to produce a first folding value (P), where $$P=(X+Y)/2$$

as shown in block 106. The folding multiplier can also compute one-half of the difference of X and Y to produce a second folding value (Q), where $$Q=(X-Y)/2$$

Subsequently, it can be determined concurrently in decision blocks 108 and 114 whether X and Y each has a value which exceeds a folding threshold below which folding values, when multiplied require less than a maximum amount of device resources to conventionally multiply. For example, to process the product of a 16-bit multiplicand and 16-bit multiplier using an 8-by-8 folding multiplier, the folding threshold can be 8 bits. Where either the value of the multiplicand or multiplier exceeds the folding threshold, first and second scaling factors K and L can be applied, respectively, to fold the excessive value below the folding threshold.

Thus, in decision blocks 108 and 114, if either of X or Y is determined to have exceeded the folding threshold, then in blocks 110 and 116, the value which has exceeded the folding threshold can be folded by a factor necessary to reduce the size of the value below the folding threshold. Otherwise, in blocks 112 and 118 the values which do not exceed the folding threshold are not scaled. Hence, to process a 12-bit value using an 8-by-8 folding multiplier, the 12-bit value can be scaled back to eight bits. By comparison, to process a 7-bit value using the 8-by-8 folding multiplier, the 7-bit value need not be scaled.

Referring to block 120, a fractional portion of the first scaling factor (K) can be subtracted from the first folding value (P) to produce a first operand, and this first operand can be squared to compute a first square (A), $$e.g.\ A=(P-K/2)^2$$

Likewise, a fractional portion of the second scaling factor (L) can be subtracted from the second folding value (Q) to produce a second operand, and this second operand can be squared to compute a second square (B)

$$e.g.\ B=(Q-L/2)^2$$

A first product (C) can be computed by multiplying the first folding value (P) by the first scaling factor and a second product (D) can be computed by multiplying the second folding value (Q) by the second scaling factor. Further, a third square (E) can be computed by squaring the fractional portion of the first scaling factor and a fourth square (F) can be computed by squaring the fractional portion of the second scaling factor. The folded product can then be computed by summing the first square (A), the first product (C) and the fourth square (F), and subtracting from the sum, the second square (B), the second product (D) and the third square (E), $$e.g.\ \text{folded product}=A-B+C-D-E+F.$$

In the instances where the multiplication process is being implemented to square a value, the multiplier and multiplicand can have the same value. Hence, the average of the multiplier and multiplicand is the value being squared and the difference of the multiplier and multiplicand is zero. Thus, the second folding value is zero and the second scaling value can be selected to be zero, resulting in a value of zero for the second square, second product and fourth square. Hence, the folding method can be shortened in such an instance. The folded product for a value being squared can be computed by summing the first square (A) and the first product (C), and subtracting from the sum the third square (E), e.g. folded product=$A+C-E$ Significantly, the multiplier of the present invention is a scalable high speed multiplier. Specifically, as the use of a folding multiplier sacrifices performance for as power efficiency, the extent of folding performed in the folding multiplier can be selectably adjusted according to changing environmental factors, for example the strength of a battery or the performance requirements of the computing device. Hence, as power efficiency becomes more important during the operation of the computing device, the extent of the folding operation can be increased. By comparison, where power efficiency is not a factor, the less efficient conventional multiplication circuitry can be utilized.

Figure 2:
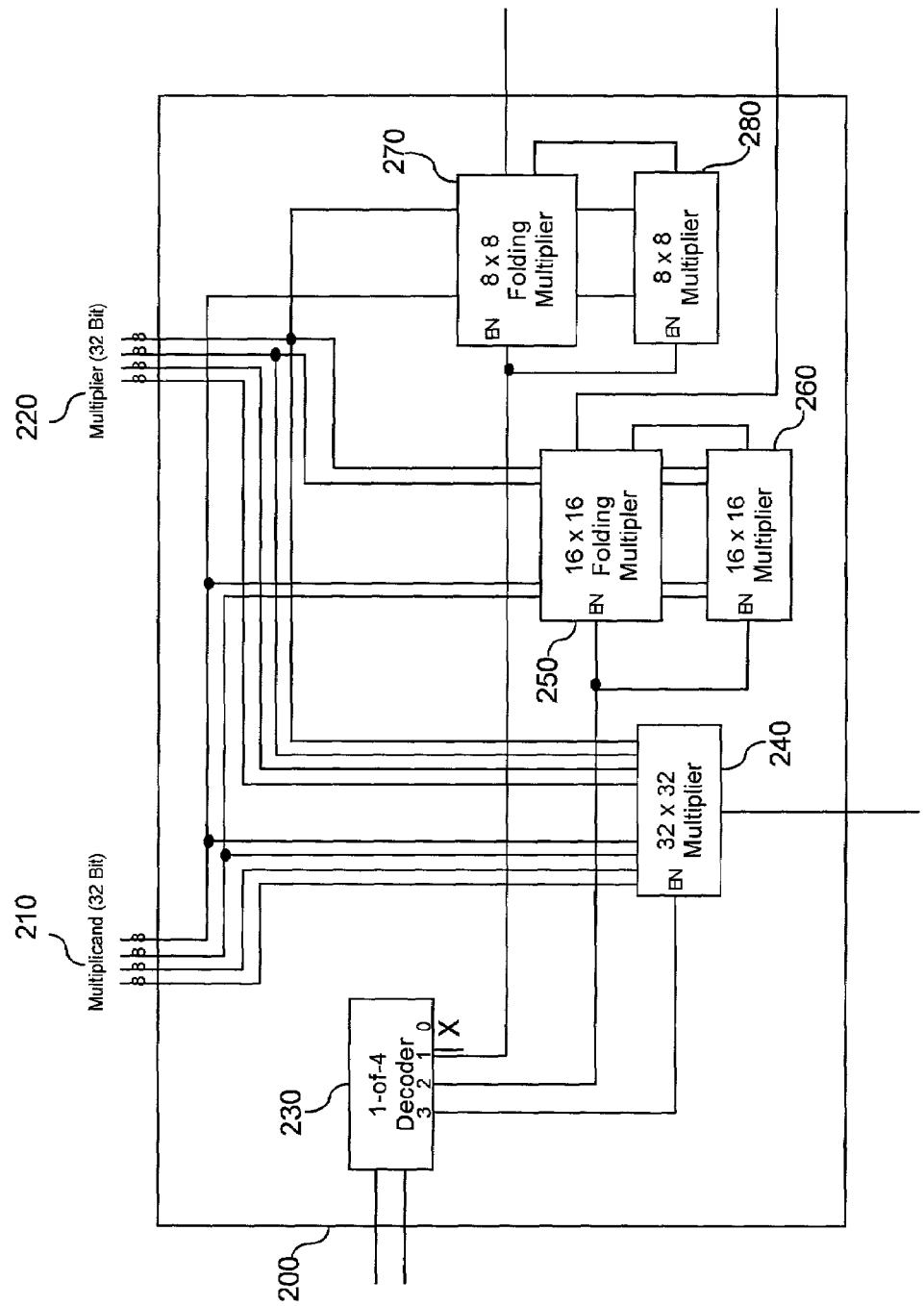
FIG. 2 is a high speed scalable multiplier configured in accordance with the inventive arrangements.

FIG. 2 is a block diagram of an exemplary high speed scalable multiplier 200 which has been configured in accordance with the inventive arrangements. The high speed scalable multiplier 200 can include one or more multipliers 240, 260, 280, a decoder 230 and one or more folding multipliers 250 and 270. Importantly, although FIG. 2 depicts a specific configuration of a 1-of-4 decoder and 32×32, 16×16 and 8×8 multipliers, the invention is not limited in the regard. Rather, consistent with the scope of the present invention any number and type of multipliers can be included in the high speed scalable multiplier 200. Furthermore, as the size and type of decoder bears relation to the number of multipliers utilized, the decoder, too, can vary in size and type.

In operation, the high speed scalable multiplier 200 can be configured to utilized a conventional multiplier, or a folding multiplier. Where multiple folding multipliers are included, the high speed scalable multiplier 200 can be configured to utilize a specific one of a set of folding multipliers. Importantly, depending upon the application, the selection of a one of the conventional and folding multipliers can occur dynamically in response to changing conditions, for example as power efficiency becomes important. As one skilled in the art will recognize, power efficiency can become critical as battery life is reduced. Hence, in one aspect of the invention, as battery life falls below a particular threshold, a particular folding multiplier can be selected depending upon the power savings required.

The multipliers can be selected dynamically through the decoder 230. When selected, the conventional multiplier 240 can produce the product of the multiplicand 210 and multiplier 220 in accordance with a conventional multiplication process. By comparison, when one of the folding multipliers 250, 270 have been selected, portions of the multiplicand 210 and multiplier 220 can be processed in the folding multiplier to produce an accurate product according to the process set forth in FIG. 1. In particular, only the least significant bits below a selected folding threshold need be provided to the folding multiplier 250, 270 in order to produce an accurate product.

Notably, as one skilled in the art will recognize, the process of FIG. 1, itself, requires the use of a multiplication operation. Accordingly, in one aspect of the invention, conventional multiplication circuitry 260, 280 can be provided for use by the folding multipliers 250, 270, respectively. Still, the invention is not limited in this regard, and the folding multipliers 250, 270 can internally incorporate conventional multiplication circuitry. In any case, by selecting a folding multiplier 250, 270 in lieu of a conventional multiplier 240, power dissipation in a host computing device can be reduced.

The present invention can be realized in hardware, software, firmware or a combination of hardware, software and firmware. A method, system and apparatus which has been configured in accordance with the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be an embedded signal processing system with a computer program that, when being loaded and executed, controls the embedded system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A high-speed scalable multiplier comprising:
a first signal input for receiving a first signal representing a multiplicand value;
a second signal input for receiving a second signal representing a multiplier value; and
a folding multiplier having circuitry for multiplying the multiplicand value times the multiplier value by
generating a first folding value and a second folding value based upon the multiplicand and multiplier values, the first folding value being equal to one half times a sum of the multiplicand value and the multiplier value, and the second folding value being equal to one half times a difference between the multiplicand value and the multiplier value,
generating a first square by squaring the difference between the first folding value and a fractional portion of a first scaling factor, the first scaling factor being equal to (a) one times a predetermined full scale value if the first folding value is greater than one half the full scale value and (b) zero if the first folding value is less than or equal to one half the full scale value,
generating a second square by squaring the difference between the second folding value and a fractional portion of a second scaling factor, the second sealing factor being equal to (a) one times the full scale value if the second folding value is greater than one half the full scale value and (b) zero if the second folding value is less than or equal to one half the full scale value,
generating a first product by multiplying the first folding value times the first scaling factor, generating a second product by multiplying the second folding value times the second scaling factor, generating a third square by squaring the fractional portion of the first scaling factor, generating a fourth square by squaring the fractional portion of the second scaling factor, and determining a folded product by generating a sum of the first square, the first product, and the fourth square, and subtracting from the sum the second square, the second product, and the third square.

2. The high-speed scalable multiplier of claim 1, further comprising at least one additional folding multiplier and a conventional multiplier, each of said at least one additional folding multiplier and conventional multiplier being individually and selectively activatable.

3. A high-speed scalable multiplier comprising:

at least one multiplier;

at least one folding multiplier having a first signal input for receiving a first signal representing a multiplicand value, a second signal input for receiving a second signal representing a multiplier value, and a folding multiplier having circuitry for multiplying the multiplicand value times the multiplier value by generating a first folding value and a second folding value based upon the multiplicand and multiplier, the first folding value being equal to an average of the multiplicand and the multiplier and the second folding value being equal to one half the difference between the multiplicand and the multiplier, generating a first square by squaring the difference between the first folding value and a fractional portion of a first scaling factor, the first scaling factor being equal to (a) one times a predetermined fill scale value if the first folding value is greater than one half the full scale value and (b) zero if the first folding value is less than or equal to one half the full scale value, generating a second square by squaring the difference between the second folding value and a fractional portion of a second scaling factor, the second scaling factor being equal to (a) one times the full scale value if the second folding value is greater than one half the full scale value and (b) zero if the second folding value is less than or equal to one half the full scale value, generating a first product by multiplying the first folding value times the first scaling factor, generating a second product by multiplying the second folding value times the second scaling factor, generating a third square by squaring the fractional portion of the first scaling factor, generating a fourth square by squaring the fractional portion of the second scaling factor, and determining a folded product by generating a sum of the first square, the first product, and the fourth square, and subtracting from the sum the second square, the second product, and the third square; and at least one decoder for dynamically selecting between the at least one multiplier and at least one folding multiplier.

4. The high-speed scalable multiplier of claim 3, wherein the dynamic selection by said at least one decoder is based upon a comparison of respective power efficiencies of the at least one multiplier and the at least one folding multiplier.

5. A machine-readable storage medium, the storage medium comprising computer instructions for:

determining a first numerical value defining a multiplicand value, the determining of the multiplicand value based upon a first electrical signal;

determining a second numerical value defining a multiplier value, the determining of the multiplier value based upon a second electrical signal;

generating a first folding value equal to one half times a sum of the multiplicand and the multiplier;

generating a second folding value one-half times a difference between the multiplicand value and the multiplier value;

generating a first square based upon a squaring of a difference between the first folding value and a portion of a first scaling factor;

generating a second square based upon a squaring of a difference between the second folding value and a portion of a second scaling factor;

generating a third square based upon a squaring of the portion of the first scaling factor;

generating a fourth square based upon a squaring of the portion of the second scaling factor;

generating a first product based upon a product of the first folding value times the first scaling factor;

generating a second product based upon a product of the second folding value tunes the second scaling factor;

generating a first sum by summing the first square, first product and fourth square;

generating a second sum by summing the second square, second product, and third square; and generating a difference by subtracting the second sum from the first sum;

wherein the first factor is zero if the multiplicand is less than a predetermined threshold, and wherein the second factor is zero if the multiplier is less than the predetermined threshold.

6. The computer readable storage medium of claim 5, further comprising a computer instruction for performing at least one of iteratively folding the multiplicand by dividing the first folding value by two if the multiplicand is greater than the predetermined threshold, and iteratively folding the multiplier by dividing the second folding value by two if the multiplier is greater than the predetermined threshold.

* * * * *